UNITED STATES PATENT OFFICE.

JOSEPH B. BOWEN, OF LEAVENWORTH, KANSAS.

IMPROVEMENT IN COMPOSITION ROOFING.

Specification forming part of Letters Patent No. 214,091, dated April 8, 1879; application filed January 2, 1879.

*To all whom it may concern:*

Be it known that I, JOSEPH B. BOWEN, of the city and county of Leavenworth, and State of Kansas, have invented a new and Improved Roofing Composition; and I do hereby declare that the following is a full, clear, and exact description of the same.

My improved roofing composition is composed of wood pulp, asbestus, coal-tar, and bran or middlings. The proportions are as follows: wood pulp, one pound; asbestus, one pound; coal-tar, four quarts; bran, four quarts.

The bran is first mixed with the four quarts of coal-tar, and this mixture is boiled until its consistency is somewhat increased. The other ingredients (pulp and asbestus) are then mixed separately, and the two mixtures are put together to form the complete composition.

The coal-tar and bran form a perfect cement, which is impervious to water. The wood pulp imparts toughness or tensile strength, and renders the composition solid and durable, without liability to crack in the coldest weather. The asbestus imparts a fire-resisting quality, and also increases the toughness of the composition.

The composition will not melt and run or drip in the warmest weather. Thus it has all the physical qualities which adapt it for valuable service in all seasons and climates. It is, moreover, cheap and easily applied.

The mode of application is to spread it while hot as a mortar or cement on the roof to be protected, when the adhesive quality of the coal-tar will cause it to adhere to the wood surface with the requisite tenacity.

The composition may be applied to felt to be used for roofing or sheathing purposes. In such case the felt may be painted with, or else immersed bodily in, the hot composition until the required degree of saturation has been attained. Felt so treated is pliable and durable and perfectly water-proof, as well as, to a certain extent, fire-proof.

I may use middlings or shorts, or rye, wheat, or buckwheat flour, in place of the bran.

I am aware asbestus and coal-tar have been used with pulverized mineral substances, such as slate; also that paper-pulp has been combined with lime, putty, gypsum, and other ingredients.

What I claim is—

The roofing composition consisting of wood pulp, bran, asbestus, and coal-tar, as before specified.

JOSEPH B. BOWEN.

Witnesses:
SCOTT ASHTON,
S. H. HOYT.